United States Patent [19]
Sekhar et al.

[11] Patent Number: 5,753,163
[45] Date of Patent: May 19, 1998

[54] PRODUCTION OF BODIES OF REFRACTORY BORIDES

[75] Inventors: Jainagesh A. Sekhar, Cincinnati, Ohio; Jean-Jacques Duruz, Geneva, Switzerland; Vittorio De Nora, Nassau, Bahamas

[73] Assignee: Moltech. Invent S.A., Luxembourg, Luxembourg

[21] Appl. No.: 519,711

[22] Filed: Aug. 28, 1995

[51] Int. Cl.$^6$ ........................................................ B28B 1/26
[52] U.S. Cl. ................................................. 264/86; 264/87
[58] Field of Search .................... 264/86, 87; 254/243 R

[56] References Cited

U.S. PATENT DOCUMENTS

| | | |
|---|---|---|
| 2,859,138 | 11/1958 | Blanchard . |
| 2,866,724 | 12/1958 | Alexander . |
| 2,915,442 | 12/1959 | Lewis . |
| 2,991,257 | 7/1961 | Smith-Johannsen . |
| 3,016,288 | 1/1962 | Andrieux et al. . |
| 3,028,324 | 4/1962 | Ransley . |
| 3,083,111 | 3/1963 | Nickerson . |
| 3,090,094 | 5/1963 | Schwarzwalder et al. . |
| 3,097,930 | 7/1963 | Holland . |
| 3,111,396 | 11/1963 | Ball . |
| 3,156,639 | 11/1964 | Kibby . |
| 3,174,872 | 3/1965 | Fisher et al. . |
| 3,215,615 | 11/1965 | Ransley . |
| 3,249,460 | 5/1966 | Gerry . |
| 3,274,093 | 9/1966 | McMinn . |
| 3,284,093 | 11/1966 | Engelmeier . |
| 3,314,876 | 4/1967 | Ransley . |
| 3,330,756 | 7/1967 | Ransley . |
| 3,345,440 | 10/1967 | Googin et al. . |
| 3,348,929 | 10/1967 | Valtschev et al. . |
| 3,400,061 | 9/1968 | Lewis et al. . |
| 3,404,031 | 10/1968 | Clayton et al. . |
| 3,442,787 | 5/1969 | Landrum et al. . |
| 3,457,158 | 7/1969 | Bullough . |
| 3,531,565 | 9/1970 | Webb et al. . |
| 3,558,450 | 1/1971 | Ashe, Jr. et al. . |
| 3,617,358 | 11/1971 | Dittrich . |
| 3,634,736 | 1/1972 | Boos et al. . |
| 3,661,736 | 5/1972 | Holliday . |
| 3,705,791 | 12/1972 | Bredzs . |
| 3,726,643 | 4/1973 | Merzhanov et al. . |
| 3,778,249 | 12/1973 | Benjamin et al. . |
| 3,852,107 | 12/1974 | Lorkin et al. . |
| 3,856,650 | 12/1974 | Kugler et al. . |
| 3,859,198 | 1/1975 | Emblem et al. . |
| 3,864,164 | 2/1975 | Hincheliffe et al. . |
| 3,893,917 | 7/1975 | Pryor et al. . |
| 3,939,028 | 2/1976 | Schiffarth et al. . |
| 3,947,363 | 3/1976 | Pryor et al. . |
| 3,962,081 | 6/1976 | Yarwood et al. . |
| 3,964,924 | 6/1976 | Kurzeja . |
| 3,969,696 | 7/1976 | Wolfe et al. . |
| 4,003,014 | 1/1977 | Branson et al. . |
| 4,024,056 | 5/1977 | Yarwood et al. . |
| 4,052,288 | 10/1977 | Sala . |
| 4,081,371 | 3/1978 | Yarwood et al. . |
| 4,093,524 | 6/1978 | Payne . |
| 4,196,227 | 4/1980 | DuBois et al. . |
| 4,202,691 | 5/1980 | Yurasko, Jr. . |
| 4,217,948 | 8/1980 | Merzhanov et al. . |
| 4,244,986 | 1/1981 | Paruso et al. . |
| 4,257,810 | 3/1981 | Narumiya . |
| 4,258,099 | 3/1981 | Narumiya . |
| 4,267,435 | 5/1981 | Best . |
| 4,292,345 | 9/1981 | Kolesnik et al. . |
| 4,308,114 | 12/1981 | Das et al. . |
| 4,308,115 | 12/1981 | Foster, Jr. et al. . |
| 4,312,718 | 1/1982 | Watanabe et al. . |
| 4,333,813 | 6/1982 | Kaplan et al. . |
| 4,333,818 | 6/1982 | Coste . |
| 4,342,637 | 8/1982 | Withers et al. . |
| 4,374,761 | 2/1983 | Ray . |
| 4,376,690 | 3/1983 | Kugler . |
| 4,384,995 | 5/1983 | Stevens . |
| 4,391,918 | 7/1983 | Brockmeyer . |
| 4,405,433 | 9/1983 | Payne . |
| 4,418,097 | 11/1983 | Misra . |
| 4,420,294 | 12/1983 | Lichtinghagen . |
| 4,427,540 | 1/1984 | Hsu et al. . |
| 4,439,382 | 3/1984 | Joo et al. . |
| 4,445,996 | 5/1984 | Kawamata et al. . |
| 4,455,211 | 6/1984 | Ray et al. . |
| 4,459,363 | 7/1984 | Holt . |
| 4,466,996 | 8/1984 | Boxall et al. . |
| 4,481,052 | 11/1984 | Buchta et al. . |
| 4,487,804 | 12/1984 | Reven . |

| | | |
|---|---|---|
| 4,508,788 | 4/1985 | Cheney . |
| 4,517,037 | 5/1985 | Francis et al. . |
| 4,534,837 | 8/1985 | Nicolas et al. . |
| 4,535,035 | 8/1985 | Smialek et al. . |
| 4,540,475 | 9/1985 | DeAngelis . |
| 4,552,630 | 11/1985 | Wheeler et al. . |
| 4,559,270 | 12/1985 | Sara . |
| 4,560,448 | 12/1985 | Sane et al. . |
| 4,567,103 | 1/1986 | Sara . |
| 4,582,553 | 4/1986 | Buchta . |
| 4,585,675 | 4/1986 | Shuford . |
| 4,592,820 | 6/1986 | McGeer . |
| 4,595,545 | 6/1986 | Sane . |
| 4,596,637 | 6/1986 | Kozarek et al. . |
| 4,599,320 | 7/1986 | Reeve et al. . |
| 4,600,481 | 7/1986 | Sane et al. . |
| 4,610,726 | 9/1986 | King . |
| 4,612,103 | 9/1986 | Dewing et al. . |
| 4,613,375 | 9/1986 | Förster et al. . |
| 4,613,418 | 9/1986 | Dewing et al. . |
| 4,614,569 | 9/1986 | Duruz et al. . |
| 4,625,261 | 11/1986 | Weeks et al. . |
| 4,650,552 | 3/1987 | de Nora et al. . |
| 4,656,906 | 4/1987 | Mozieka et al. . |
| 4,670,201 | 6/1987 | Montgomery et al. . |
| 4,670,407 | 6/1987 | Kiehl et al. . |
| 4,678,548 | 7/1987 | Brown . |
| 4,678,760 | 7/1987 | Ray . |
| 4,680,094 | 7/1987 | Duruz . |
| 4,681,671 | 7/1987 | Duruz . |
| 4,681,819 | 7/1987 | Gnyra . |
| 4,683,037 | 7/1987 | Duruz . |
| 4,697,632 | 10/1987 | Lirones . |
| 4,699,763 | 10/1987 | Sinharoy et al. . |
| 4,710,348 | 12/1987 | Brupbacher et al. . |
| 4,711,666 | 12/1987 | Chapman et al. . |
| 4,726,995 | 2/1988 | Chiu . |
| 4,737,247 | 4/1988 | Jarrett et al. . |
| 4,737,253 | 4/1988 | Gesing et al. . |
| 4,738,389 | 4/1988 | Moshier et al. . |
| 4,747,873 | 5/1988 | Kamioka . |
| 4,751,048 | 6/1988 | Christodoulou et al. . |
| 4,769,074 | 9/1988 | Holcombe, Jr. et al. . |
| 4,769,237 | 9/1988 | Bittle et al. . |
| 4,772,452 | 9/1988 | Brupbacher et al. . |
| 4,774,052 | 9/1988 | Nagel et al. . |
| 4,800,065 | 1/1989 | Christodoulou et al. . |
| 4,808,372 | 2/1989 | Koczak et al. . |
| 4,836,982 | 6/1989 | Brupbacher et al. . |
| 4,857,289 | 8/1989 | Nauroth et al. . |
| 4,865,701 | 9/1989 | Beck et al. . |
| 4,877,759 | 10/1989 | Holt et al. . |
| 4,885,073 | 12/1989 | Gaungchun et al. . |
| 4,900,698 | 2/1990 | Lundsager . |
| 4,902,457 | 2/1990 | Wada et al. . |
| 4,904,424 | 2/1990 | Johnson . |
| 4,909,842 | 3/1990 | Dunmead et al. . |
| 4,915,903 | 4/1990 | Brupbacher et al. . |
| 4,915,905 | 4/1990 | Kampe et al. . |
| 4,919,771 | 4/1990 | Wilkening . |
| 4,921,731 | 5/1990 | Clark et al. . |
| 4,929,328 | 5/1990 | Besmann et al. . |
| 4,931,413 | 6/1990 | Weir et al. . |
| 4,935,265 | 6/1990 | Pike . |
| 4,944,991 | 7/1990 | Karas et al. . |
| 4,948,676 | 8/1990 | Darracq et al. . |
| 4,948,761 | 8/1990 | Hida . |
| 4,957,885 | 9/1990 | Hilda . |
| 4,961,778 | 10/1990 | Pyzik et al. . |
| 4,965,044 | 10/1990 | Miyamoto et al. . |
| 4,966,674 | 10/1990 | Banocchie et al. . |
| 4,975,191 | 12/1990 | Brockmeyer et al. . |
| 4,975,412 | 12/1990 | Okazaki et al. . |
| 4,983,423 | 1/1991 | Goldsmith . |
| 4,985,202 | 1/1991 | Moshier et al. . |
| 4,988,480 | 1/1991 | Mezhanov et al. . |
| 4,988,645 | 1/1991 | Holt et al. . |
| 4,990,295 | 2/1991 | Hida . |
| 4,996,024 | 2/1991 | Nishio et al. . |
| 4,999,144 | 3/1991 | Miyamoto et al. . |
| 5,004,524 | 4/1991 | Duruz . |
| 5,006,290 | 4/1991 | Hida . |
| 5,015,343 | 5/1991 | LaCamera et al. . |
| 5,019,225 | 5/1991 | Darracq et al. . |
| 5,019,454 | 5/1991 | Bussee . |
| 5,022,975 | 6/1991 | Gordon . |
| 5,022,991 | 6/1991 | Day et al. . |
| 5,026,422 | 6/1991 | Osborne . |
| 5,030,600 | 7/1991 | Hida et al. . |
| 5,032,332 | 7/1991 | Hida et al. . |
| 5,069,764 | 12/1991 | Watanabe et al. . |
| 5,071,533 | 12/1991 | de Nora et al. . |
| 5,071,674 | 12/1991 | Nogues et al. . |
| 5,071,797 | 12/1991 | Hida . |
| 5,077,246 | 12/1991 | Weaver et al. . |
| 5,110,427 | 5/1992 | Meyer . |
| 5,110,688 | 5/1992 | Sekhar et al. . |
| 5,112,654 | 5/1992 | Claar . |
| 5,116,691 | 5/1992 | Darolia et al. . |
| 5,135,621 | 8/1992 | de Nora et al. . |
| 5,137,749 | 8/1992 | Yamazaki et al. . |
| 5,143,668 | 9/1992 | Hida . |
| 5,145,619 | 9/1992 | Abramovici . |
| 5,149,677 | 9/1992 | Merzhanov et al. . |
| 5,154,785 | 10/1992 | Tabata et al. . |
| 5,158,655 | 10/1992 | Townsend . |
| 5,164,233 | 11/1992 | Sonuparlak et al. . |
| 5,169,307 | 12/1992 | Frye . |
| 5,169,572 | 12/1992 | Mathews . |
| 5,188,678 | 2/1993 | Sekhar et al. . |
| 5,194,330 | 3/1993 | Vandenbulcke et al. . |
| 5,201,947 | 4/1993 | Niebylski . |
| 5,203,971 | 4/1993 | de Nora et al. . |
| 5,217,583 | 6/1993 | Sekhar et al. . |
| 5,250,324 | 10/1993 | Claar . |
| 5,279,715 | 1/1994 | La Camera et al. . |
| 5,299,621 | 4/1994 | Claar et al. ............................ 264/86 X |
| 5,310,476 | 5/1994 | Sekhar et al. . |
| 5,316,718 | 5/1994 | Sekhar . |
| 5,320,717 | 6/1994 | Sekhar . |
| 5,340,014 | 8/1994 | Sekahr et al. . |
| 5,340,448 | 8/1994 | Sekhar et al. . |
| 5,342,491 | 8/1994 | Sekhar . |
| 5,362,366 | 11/1994 | de Nora et al. . |
| 5,364,442 | 11/1994 | Sekhar . |
| 5,364,513 | 11/1994 | Sekhar et al. . |
| 5,374,342 | 12/1994 | Sekhar . |
| 5,378,327 | 1/1995 | Sekhar et al. . |
| 5,397,450 | 3/1995 | Sekhar et al. . |
| 5,409,589 | 4/1995 | Sekhar . |
| 5,409,868 | 4/1995 | Dasgupta et al. . |
| 5,413,689 | 5/1995 | de Nora et al. . |
| 5,420,084 | 5/1995 | Morel . |
| 5,492,604 | 2/1996 | Ray . |
| 5,507,933 | 4/1996 | de Nora et al. . |
| 5,527,442 | 6/1996 | Sekhar et al. . |
| 5,534,119 | 7/1996 | Sekhar . |
| 5,534,130 | 7/1996 | Sekhar . |
| 5,578,174 | 11/1996 | Sekhar . |

FOREIGN PATENT DOCUMENTS

| | | |
|---|---|---|
| 0102186 | 3/1984 | European Pat. Off. . |
| 0126555 | 11/1984 | European Pat. Off. . |
| 0145417 | 11/1984 | European Pat. Off. . |

| | | |
|---|---|---|
| 0134769 | 3/1985 | European Pat. Off. . |
| 0258510 | 3/1985 | European Pat. Off. . |
| 0145412 | 6/1985 | European Pat. Off. . |
| 0192602 | 8/1986 | European Pat. Off. . |
| 0233398 | 8/1987 | European Pat. Off. . |
| 0257708 | 3/1988 | European Pat. Off. . |
| 0367372 | 5/1989 | European Pat. Off. . |
| 0404943 | 1/1991 | European Pat. Off. . |
| 0426485 | 5/1991 | European Pat. Off. . |
| 0431165 | 6/1991 | European Pat. Off. . |
| 0467540 | 1/1992 | European Pat. Off. . |
| 1173804 | 10/1958 | France . |
| 2635337 | 2/1990 | France . |
| 2144156 | 4/1972 | Germany . |
| 2809295 | 2/1979 | Germany . |
| 3538294 | 4/1987 | Germany . |
| 3802670 | 8/1989 | Germany . |
| 0760623 | 11/1956 | United Kingdom . |
| 1177829 | 1/1970 | United Kingdom . |
| 2011361 | 7/1979 | United Kingdom . |
| 2094346 | 9/1982 | United Kingdom . |
| 2155484 | 9/1985 | United Kingdom . |
| 8803519 | 5/1988 | WIPO . |
| 9007013 | 12/1988 | WIPO . |
| 9003956 | 4/1990 | WIPO . |
| 9013513 | 11/1990 | WIPO . |
| 9200399 | 1/1992 | WIPO . |
| 9209724 | 6/1992 | WIPO . |
| 9222682 | 12/1992 | WIPO . |
| 9325731 | 12/1993 | WIPO . |
| WO93/25731 | 12/1993 | WIPO . |
| 9424337 | 10/1994 | WIPO . |

OTHER PUBLICATIONS

C. Ozaki and K. Tasumi, Change of the Physical Properties and The Structure in Carbon Materials Under Electrolysis Test, Light Metals 1992, Edited by Euel R. Cutshall, The Minerals, Metals & Materials Society, 1991, pp. 759–764 (no month).

Jilai Xue and Harald A. Oye, Sodium and Bath Penetration Into $TiB_2$–Carbon Cathodes During Laboratory Aluminium Electrolysis, Light Metals 1992, Edited by Euel R. Cutshall, The Minerals, Metals & Materials Society, 1991, pp. 773–778 (no month).

Jörg Mittag, E. Bernhauser and H. Friedli, Sodium, Its Influence on Cathode Life in Theory and Practice, Light Metals 1992, Edited by Euel R. Cutshall, The Minerals, Metals & Materials Society, 1992, pp. 789–793 (no month).

Patent Abstracts of Japan, vol. 5, No. 012 (C–040) –Jan. 24, 1981.

Chemical Abstracts, vol. 108, 1988, No. 10, Abstract No. 80756n –Mar. 7, 1988.

Chemical Abstracts, vol. 104, 1984, No. 154386u (no month).

Chemical Abstracts, vol. 114, No. 2, 14 Jan. 1991, Abstract No. 11194q, S. Kuroyanagi; p. 279.

Chemical Abstracts, vol. 114, No. 8, Feb. 25, 1991, Abstract No. 67830m.

WPI/Derwent–AN 78–52047A –Mar. 1, 1978.
WPI/Derwent–AN 85–280492 –Sep. 28, 1985.
WPI/Derwent–AN 84–142629 –Apr. 24, 1984.

JM. Peyneau, Jr. Gaspard and D. Dumas. B. Samanos, Laboratory Testing of the Expansion Under Pressure Due to Sodium Intercalation in Carbon Cathode Materials for Aluminium Smelters, Light Metals 1992, Edited by Euel R. Cutshall, The Minerals, Metals & Materials Society, 1991 (no month).

Gösta Wranglen, Kolektroders reaktivitet och dess beroende av oorganiska katalysatorer och inhibitorer, Jernkont. Ann. 142 (1958): 10(with translation) (no month).

"Graphite Electrodes", Ind. Eng. Chem., v. 46, 2–11, 1954, no month.

"Technology" section of Chemical and Engineering News, v. 33, No. 25, p. 2608, Jun. 20, 1955.

"Norton Develops New Oxide Refractory Coatings", Bull. Ann. (Exam. Suc., v. 34, No. 7, p. 233, 1955) (no month).

J.W. McCauley et al. "Simultaneous Preparation . . . ", Ceramic Engineering, 3 (1982), pp. 538–554 (no month).

R.W. Rice et al., "Effects of Self–propagating . . . ", Ceramic Engineering, 7 (1986), pp. 737–751 (no month).

H.C. Yi, Journal Materials Science, 25 (1990) pp. 1159–1168 (no month).

Yi, et al., Self–Propagating High–Temperature (Combustion) Synthesis (SHS) of Powder–Compacted Materials, N.M., 1992 (no month).

C.H. Samans "Powder Metallurgy", American Society For Metals, Metals Handbook, 1948, pp. 47–52 (no month).

Jun–ichi Matsushita, et al., Pressureless Sintering of $TiB_2$–$Al_2O_3$, 6124 Journal of the Ceramic Society of Japan, International Edition, vol. 97, (1989) Oct., No. 10, Tokyo, Japan, pp. 1200–1205.

*Primary Examiner*—Donald R. Valentine
*Attorney, Agent, or Firm*—Dinsmore & Shohl, LLP

[57] ABSTRACT

A method of producing a self-sustaining body of refractory boride from the group consisting of the borides of titanium, chromium, vanadium, zirconium, hafnium, niobium, tantalum, molybdenum and cerium. This body includes a refractory boride and a dried colloid from the group consisting of colloidal alumina, silica, yttria, ceria, thoria, magnesia, lithia, monoaluminium phosphate and cerium acetate and is obtained from a slurry of the refractory boride in one or more of said colloids by casting the slurry on a porous plaster layer, and drying the cast slurry by draining through the plaster, or by pressing/drying. Subsequently, the dried body is subjected to heat treatment to bond the refractory boride in the dried colloid. The bodies are useful as components of aluminium electrowinning cells.

15 Claims, No Drawings

1

PRODUCTION OF BODIES OF REFRACTORY BORIDES

FIELD OF THE INVENTION

The invention relates to the production of bodies of refractory borides for use in cells for the electrowinning of aluminium by electrolysis of alumina dissolved in a fluoride-based molten electrolyte such as cryolite. The invention also relates to the bodies of the refractory borides and cell components made therefrom, as well as cells for the electrowinning of aluminium including these components and their use to produce aluminium.

BACKGROUND OF THE INVENTION

Aluminium is produced conventionally by the Hall-Héroult process, by the electrolysis of alumina dissolved in cryolite-based molten electrolytes at temperatures up to around 950° C. A Hall-Heroult reduction cell typically has a steel shell provided with an insulating lining of refractory material, which in turn has a lining of carbon which contacts the molten constituents. Conductor bars connected to the negative pole of a direct current source are embedded in the carbon cathode substrate forming the cell bottom floor. The cathode substrate is usually an anthracite based carbon lining made of prebaked cathode blocks, joined with a ramming mixture of anthracite, coke, and coal tar, or with glue.

In Hall-Héroult cells, a molten aluminium pool acts as the cathode. The carbon lining or cathode material has a useful life of three to eight years, or even less under adverse conditions. The deterioration of the cathode bottom is due to erosion and penetration of electrolyte and liquid aluminium as well as penetration and intercalation of sodium, which causes swelling, deformation and disintegration of the cathode carbon blocks and ramming mix. In addition, the penetration of sodium species and other ingredients of cryolite or air leads to the formation of toxic compounds including cyanides.

Difficulties in operation also arise from the accumulation of undissolved alumina sludge on the surface of the carbon cathode beneath the aluminium pool which forms insulating regions on the cell bottom. Penetration of cryolite and aluminium through the carbon body and the deformation of the cathode carbon blocks also cause displacement of such cathode blocks. Due to displacement of the cathode blocks, aluminium reaches the steel cathode conductor bars causing corrosion thereof leading to deterioration of the electrical contact, non uniformity in current distribution and an excessive iron content in the aluminium metal produced.

A major drawback of carbon as cathode material is that it is not wetted by aluminium. This necessitates maintaining a deep pool of aluminium (at least 100–250 mm thick) in order to ensure a certain protection of the carbon blocks and an effective contact over the cathode surface. But electromagnetic forces create waves in the molten aluminium and, to avoid short-circuiting with the anode, the anode-to-cathode distance (ACD) must be kept at a safe minimum value, usually 40 to 60 mm. For conventional cells, there is a minimum ACD below which the current efficiency drops drastically, due to short-circuiting between the aluminium pool and the anode. The electrical resistance of the electrolyte in the inter-electrode gap causes a voltage drop from 1.8 to 2.7 volts, which represents from 40 to 60 percent of the total voltage drop, and is the largest single component of the voltage drop in a given cell.

To reduce the ACD and associated voltage drop, extensive research has been carried out with Refractory Hard Metals or Refractory Hard Materials (RHM) such as $TiB_2$ as cathode materials. $TiB_2$ and other RHM's are practically insoluble in aluminium, have a low electrical resistance, and are wetted by aluminium. This should allow aluminium to be electrolytically deposited directly on an RHM cathode surface, and should avoid the necessity for a deep aluminium pool. Because titanium diboride and similar Refractory Hard Metals are wettable by aluminium, resistant to the corrosive environment of an aluminium production cell, and are good electrical conductors, numerous cell designs utilizing Refractory Hard Metal have been proposed, which would present many advantages, notably including the saving of energy by reducing the ACD.

The use of titanium diboride and other RHM current-conducting elements in electrolytic aluminium production cells is described in U.S. Pat. Nos. 2,915,442, 3,028,324, 3,215,615, 3,314,876, 3,330,756, 3,156,639, 3,274,093 and 3,400,061. Despite extensive efforts and the potential advantages of having surfaces of titanium diboride at the cell cathode bottom, such propositions have not been commercially adopted by the aluminium industry.

To be useful as cathodes in aluminium production cells in particular in a drained configuration, it is necessary to have tiles or other bodies of the aluminium-wettable refractory boride of a certain dimension and mechanical resistance.

However, using known procedures, tiles of $TiB_2$ or other refractory borides are expensive and cannot be made in large sizes, and their performance in aluminium production cells has been inadequate.

The refractory borides, in particular $TiB_2$, are difficult-to-sinter materials. Sintering has to take place at high temperatures (>2000° C.) under pressure for a long time, which makes the material expensive. During sintering at these high temperatures, impurities such as titanium carbide migrate from the bulk to the grain boundaries where they react. Specifically, titanium carbide is detrimental to the sintered material's structural integrity in the presence of liquid aluminium.

Various types of $TiB_2$ or RHM layers applied to carbon substrates have failed due to poor adherence and to differences in thermal expansion coefficients between the titanium diboride material and the carbon cathode block.

U.S. Pat. No. 5,320,717, the content whereof is incorporated herein by way of reference, provides a method of bonding bodies of Refractory Hard Material (RHM) or other refractory composites to carbon cathodes of aluminium production cells using a colloidal slurry comprising particulate preformed RHM in a colloidal carrier selected from colloidal alumina, colloidal yttria and colloidal ceria as a glue between the bodies and the cathode or other component. The slurry is dried to bond the bodies to the cathode or other component, the dried slurry acting as a conductive thermally-matched glue which provides excellent bonding of the bodies to the cathode or other component.

U.S. Pat. No. 5,310,476 discloses a method of producing a protective refractory coating on a substrate of, inter-alia, carbonaceous materials by applying to the substrate a micropyretic reaction layer from a slurry containing particulate reactants in a colloidal carrier, and initiating a micropyretic reaction. The micropyretic slurry optionally also contains some preformed refractory material, and the micropyretic slurry may be applied on a non-reactive sub-layer.

PCT application WO/93/25731 discloses applying a protective coating of a refractory boride such as $TiB_2$ to a carbon component of an aluminium production cell, by applying thereto a slurry of particulate boride in a colloid in several layers with drying between each layer.

SUMMARY OF THE INVENTION

The invention aims to overcome the deficiencies of past attempts to produce bodies of refractory borides for use as cell components for aluminium production cells, especially for use as cathodes.

An object of the invention is to produce refractory boride bodies starting from readily available commercial particulate borides that are relatively inexpensive.

Another object of the invention is to produce bodies of refractory borides that can be made to sufficiently large dimensions and with adequate mechanical resistance, these bodies being aluminium-wettable and electrically conductive so they can serve as cathodes or other cell components of aluminium production cells.

The invention provides a method of producing a self-sustaining body of refractory boride from the group consisting of the borides of titanium, chromium, vanadium, zirconium, hafnium, niobium, tantalum, molybdenum and cerium. The body according to the invention includes a refractory boride containing a colloid from the group consisting of colloidal alumina, silica, yttria, ceria, thoria, magnesia, lithia, monoaluminium phosphate and cerium acetate and is obtained from a slurry of particulate refractory boride in one or more of said colloids, by forming and drying the slurry.

Prior to or upon inserting the body into an aluminium production cell, the dried body is subjected to heat treatment to bond the refractory boride in the dried colloid, and densify the body.

One method of forming the body is by casting. Preferably, casting takes place using the well known slip-casting process where the slurry is poured into a die or mold on a porous layer which typically is made of plaster such as plaster of Paris. The cast slurry is then allowed to dry by draining the liquid through the plaster, which usually takes several hours.

By choosing a die or mold of appropriate shape and filling it to the desired level, cast bodies of any desired shape and size can be produced, from simple tiles or blocks to complex shapes like a grid. The die or mold used for casting can be removed and reused, or may be a sacrificial die.

The bodies can be cast in relatively thick layers to form, when dried, a self-supporting "green" body that can be consolidated by heat treatment. The practical minimum thickness of the body is about 3 millimeters.

The body may also be formed with the application of pressure, such as by cold pressing, in particular cold isostatic pressing, during which liquid is squeezed out. Hot isostatic pressing can also be employed.

It is possible to heat the green body with a suitable heat source so as to completely dry it and improve densification. Drying takes place preferably in air but could be in other oxidising atmospheres or in inert or reducing atmospheres. Drying by draining in ambient conditions for several hours is usually sufficient but the drying may include heat treatment in air at about 80°–200° C., for half an hour to several hours.

Subsequent heat treatment of the body takes place for example at from 1000° to 1600° C., typically at around 1200°, for several hours, typically about 24 hours, under an inert atmosphere such as argon. Heat treatment densities and consolidates the body.

The body forming the component may be heat treated outside the aluminium production cell and the treated body then inserted into the cell. Alternatively, the body is part of a cell which is heated in the cell prior to operation.

The dried colloid acts first as a binding agent which holds the green body together, then during the heat treatment it acts as a sintering aid to bond the refractory boride. The basis of the invention is that instead of trying to consolidate titanium diboride or the other refractory borides by sintering boride particles together above 2000° C., a ceramic-ceramic composite is prepared where one ceramic phase (the boride) is in a ceramic matrix which maintains the boride particles in a body, thereby lowering the bonding temperature to, say, 1200° C. Bonding at this temperature is achieved much more easily than sintering at high temperatures (>2000° C.). Because the bonding temperature is much lower than 2000° C., there is no significant migration of impurities such as TiC and there is no reaction of TiC at the lower temperature. Consequently, the purity requirement of the $TiB_2$ is much less severe, also decreasing the cost.

In the cast or pressed body, the boride particles are touching because of the volume fraction of the boride (>90% boride, <10% alumina or other binder) and because of the small size of the colloidal binder. Colloidal alumina acts as an inert binder because the alumina is non-reactive and the same applies to other colloids. The non-reactive colloidal binder in particular distinguishes over known carbon binders for titanium diboride, due to the fact that the carbon in such binders tends to react with titanium in the presence of molten aluminium. Titanium diboride is inert with respect to alumina and the other colloids in the cast body of the invention.

The bodies can be reinforced by including in the mold fibers or a woven or reticulated body or matrix of suitable composition. For example, for cathodic applications, carbon fibers can be included. Suitable reticulated reinforcing bodies include porous alumina or other porous oxides and porous metals.

After production of the body and after or during heat treatment, the body can be coated with one or more layers of a coating of particulate boride in a colloid, or impregnated with the colloid alone, or subjected to other treatments including aluminization.

Generally, before or after heating and before use, the body can be painted, sprayed, dipped or infiltrated with reagents and precursors, gels and/or colloids.

To assist rapid wetting by molten aluminium, the self-sustaining refractory body may be exposed to molten aluminium in the presence of a flux assisting penetration of aluminium into the refractory boride, the flux for example comprising a fluoride, a chloride or a borate, of at least one of lithium and sodium, or mixtures thereof. Such treatment favors aluminization of the surface of the body by the penetration therein of aluminium.

The aluminum-wettable refractory boride bodies will permit the elimination of the thick aluminium pool required to partially protect the carbon cathode, enabling the cell to operate with a drained cathode.

The refractory boride bodies have the following attributes: excellent wettability by molten aluminium, inertness to attack by molten aluminium and cryolite, low cost, environmentally safe, ability to absorb thermal and mechanical shocks, durability in the environment of an aluminium production cell, and ease of production and processing. The preferred bodies furthermore have a controlled microporosity by having an adequate distribution of the particle sizes of the preformed refractory boride.

The refractory boride bodies find many applications on account of their excellent resistance, protection, and stability when exposed to the corrosive conditions existing in the cell even when the temperature of operation is low as in the Low Temperature electrolysis process for the production of aluminium (see for example U.S. Pat. No. 4,681,671 and PCT application WO 93/10281).

The Colloidal Slurry

The colloidal slurry used in the invention is known from WO93/25731 for the application of refractory hard metal boride coatings to carbon-containing components of cells for the production of aluminium by the electrolysis of alumina dissolved in a cryolite-based molten electrolyte, which slurry is composed of pre-formed particulate refractory boride in a colloidal carrier.

The colloidal carrier—colloidal alumina, silica, yttria, ceria, thoria, zirconia, magnesia, lithia, monoaluminium phosphate or cerium acetate, usually in an aqueous medium—has been found to considerably improve the production of boride bodies. Without the colloid it proves impossible to produce boride bodies consolidated by heat treatment at "low" temperatures, say 1200° C., but instead sintering at temperatures above 2000° C. is necessary, with the attendant disadvantages.

The colloidal slurry contains particulate pre-formed refractory hard metal boride (s). Above 900° C., sintering or consolidation may occur during a heat treatment which may include exposure to the service conditions at the high temperature.

The constituents of the slurries are:

(a) A carrier, chosen from colloidal liquids, namely colloidal alumina, silica, yttria, ceria, thoria, zirconia, magnesia, lithia, monoaluminium phosphate, cerium acetate or mixtures thereof.

(b) A powder additive containing pre-formed refractory borides.

The colloid may be derived from colloid precursors and reagents which are solutions of at least one salt such as chlorides, sulfates, nitrates, chlorates, perchlorates or metal organic compounds such as alkoxides, formates, acetates of aluminium, silicon, yttrium, cerium, thorium zirconium, magnesium and lithium. These colloid precursors or colloid reagents can contain a chelating agent such as acetyl acetone or ethylacetoacetate. The aforesaid solutions of metal organic compounds, principally metal alkoxides, can be of the general formula $M(OR)_z$ where M is a metal or complex cation, R is an alkyl chain and z is a number, preferably from 1 to 12.

The pre-formed particulate refractory boride is selected from borides of titanium, chromium, vanadium, zirconium, hafnium, niobium, tantalum, molybdenum and cerium. The preferred particulate refractory boride is titanium diboride.

When choosing powder additives the particle size selection is of importance. It is preferable to choose particle size below 100 micrometers and to choose particle sizes which are varied such that the packing of particles is optimized. For example it is preferable to choose particle sizes extending over a range where the smallest particles are at least two times and preferably at least three times smaller than the large ones. Generally, the ratio of the particle sizes will be in the range from 2:1 to 15:1, usually from about 3:1 to 10:1, for instance a ratio of about 3:1 with large particles in the range 15 to 30 micrometers and small particles in the range 5 to 10 micrometers, or a ratio of about 10:1 with large particles in the range from 30 to 50 micrometers and small particles in the range from 3 to 5 micrometers. Usually, the pre-formed particulate metal boride has particles with sizes in the range from about 3 micrometers to about 50 micrometers.

The slurry usually contains 5–100 g of the pre-formed particulate refractory boride per 10 ml of colloid and the colloid has a dry colloid content corresponding to up to 50 weight % of the colloid plus liquid carrier, preferably from 5 to 20 weight %, the optimum being from 7–15 weight %.

Cell Components

The invention also concerns cell components of aluminium production cells, in particular those which in use of the cell are exposed to contact with molten cryolite and/or molten aluminium. The cell component is for instance a cathode or forms part of a cathodic cell bottom, or may be a tile or a component such as a weir or a baffle immersed in the molten aluminium.

According to the invention, there is provided a component of a cell for the production of aluminium by the electrolysis of alumina dissolved in a cryolite-based molten electrolyte, which cell component for example in use is subjected to exposure to molten cryolite and/or to molten aluminium. The cell component comprises a self-sustaining body of refractory boride from the group consisting of the borides of titanium, chromium, vanadium, zirconium, hafnium, niobium, tantalum, molybdenum and cerium, which body includes a refractory boride and a colloid from the group consisting of colloidal alumina, silica, yttria, ceria, thoria, zirconia, magnesia, lithia, monoaluminium phosphate and cerium acetate, and is obtained from a slurry of particulate refractory boride in one or more of said colloids, by forming and drying the cast slurry, for example by slip casting or by cold or hot pressing, as explained before.

The component may be a current-carrying component for example a cathode, a cathode current feeder, or the cathodic part of a bipolar electrode.

The bodies may consist of blocks or tiles that can be fitted together to form a cell bottom of an aluminium production cell, which acts to carry current to the cathodic pool if there is one, or to a thin layer of aluminium in drained cells, or they may form a packed bed of bodies on a cell bottom.

The component advantageously forms part of a cathode through which the electrolysis current flows, the refractory boride body forming a cathodic surface in contact with the cathodically-produced aluminium. For example, it is part of a drained cathode, the refractory boride body forming the cathodic surface on which the aluminium is deposited cathodically, and the component being arranged usually upright or at a slope for the aluminium to drain from the cathodic surface.

Electrolytic Cells and Operation

The invention also relates to an aluminium electrowinning cell comprising a body forming a cell component as discussed above as well as a method of producing aluminium using such cells and methods of operating the cells.

Such cells may comprise a component which in operation of the cell is exposed to molten cryolite or aluminium, said component comprising a body as discussed above, wherein the product aluminium is in contact with the refractory boride body, which may be a cathode or form part of a cathodic cell bottom.

A method of operating the cells comprises producing a cell component which comprises a cast or pressed refractory body containing dried colloid and optionally subjecting the component to heat treatment; placing the component in the cell so it will be contacted by the cathodically produced aluminium, and/or the molten electrolyte; and operating the cell to produce molten aluminium.

Operation of the cell is advantageously in a low temperature process, with the molten fluoride-based electrolyte containing dissolved alumina at a temperature below 900° C., usually at a temperature from 680° C. to 880° C. The low temperature electrolyte may be a fluoride melt or a mixed fluoride-chloride melt.

This low temperature process is operated at low current densities on account of the low alumina solubility. This necessitates the use of large anodes and corresponding large cathodes, exposing large areas of these materials to the corrosive conditions in the cell.

DETAILED DESCRIPTION

The invention will be further described by way of example.

EXAMPLE I

A slurry was prepared from a dispersion of 25 g $TiB_2$, 99.5% pure, -325 mesh (<42 micrometer), per 10 ml of colloidal alumina containing about 20 weight % of solid alumina.

The slurry was cast into a rectangular die on a plaster of Paris base and was allowed to dry in ambient conditions by draining of the liquid through the plaster.

After drying for several hours, the "green" body was removed from the die. It formed a self-sustaining body which was then subjected to heat treatment at 1200° C. for 24 hours under Argon. The resulting body of $TiB_2$ bonded by the dried colloid was mechanically strong.

The above procedure was repeated varying the amount of $TiB_2$ in the slurry from 10 to 50 g and varying the amount of colloidal alumina from 50 ml to 20 ml.

A sample of slip-cast $TiB_2$, produced as above, was thermally heated at 950° C. for 10 hours under a bed of resistor coke and then electrolyzed as a cathode in a laboratory aluminium production cell containing molten cryolite-alumina at a temperature of 950° C., for 9.5 hours.

After electrolysis, the sample was dimensionally stable, showed no sign of deterioration and was excellently wetted by aluminium.

A body produced as above, but subjected to heat treatment at 1250° C. for 10 hours under argon, was subjected to a sodium penetration test by connecting it as a cathode in a NaF/NaCl bath (67.7 wt %/32.3 wt %) at 720° C. for 4.5 hours at a current density of 0.15 A/$cm^2$. The sample was dimensionally stable after electrolysis. Carbon cathodes subjected to the same treatment show signs of deterioration due to sodium penetration.

EXAMPLE II

(COMPARATIVE)

A slurry of particulate $TiB_2$ was prepared as in Example 1, except that 25 g of the $TiB_2$ was in a dispersion in 10 ml of water. The slurry was cast as before, dried and heated at 1200° C. for 24 hours under Argon, but the resulting body was found to be poorly consolidated and crumbled easily. In principle, such body can only be consolidated in sintering at temperatures above 2000° C.

EXAMPLE III

A slurry was prepared from a dispersion of 35 g $TiB_2$, 99.5% pure, per 10 ml of colloidal alumina of different grades containing from about 5 weight % to about 25 weight % of solid alumina. The $TiB_2$ had a grain size either of -325 mesh (<42 micrometers) or an average grain size from 2 to 4 micrometer. Good slurries were obtained and were slip cast into self-sustaining bodies which were subjected to heat treatment at 200° C. to 1550° C. for 1 or 2 hours. After the heat treatment, the density of the bodies was measured. The following results reported in Table I show the density and percentage of the theoretical density of the bodies as a function of the temperature of the heat treatment.

TABLE I

| Temperature °C. | Time/Hours | Density (Average g/$cm^2$) | % density |
| --- | --- | --- | --- |
| 200 | 2 | 2.83 | 62.6 |
| 600 | 2 | 2.91 | 64.4 |
| 930 | 2 | 3.01 | 66.6 |
| 1150 | 1 | 3.06 | 67.7 |
| 1550 | 1 | 3.14 | 69.5 |

EXAMPLE IV

Example III was repeated except that the bodies were formed by cold isostatic pressing at a pressure of 207 Kpsi or 172.5 Kpsi, during which liquid was squeezed out, leading to a dried compact body. The bodies were subjected to heat treatment as before and the results are shown in Table II:

TABLE II

| Temperature °C. | Time/Hours | Pressure | Density g/$cm^2$ | % density |
| --- | --- | --- | --- | --- |
| 200 | 2 | 172.5 | 2.99 | 66.1 |
| 200 | 2 | 207 | 3.21 | 71.0 |
| 600 | 2 | 172.5 | 2.94 | 65.0 |
| 600 | 2 | 207 | 3.14 | 69.5 |
| 930 | 2 | 172.5 | 3.00 | 66.4 |
| 930 | 2 | 207 | 3.18 | 70.3 |
| 1150 | 1 | 172.5 | 3.06 | 67.7 |
| 1150 | 1 | 207 | 3.28 | 72.6 |
| 1550 | 1 | 207 | 3.72 | 82.2 |

It can be seen that cold isostatic pressing produces denser bodies than slip casting. As before, the density increases with increasing temperature.

EXAMPLE V

Bodies were prepared by slip casting a slurry of titanium diboride particles in colloidal alumina, with 25 g of $TiB_2$, per 10 ml of colloidal alumina as before, but varying the alumina concentration from 0 up to 20% by weight. The slurries were poured in plaster of paris molds which were coated with a mold releasing agent. After more than 6 hours, the green samples were removed from the mold and polished into a rectangular shape measuring approx. 5×1.25×0.5 cm. The green strength of the samples was then measured by a bending test. Below approx. 4% of alumina, the samples displayed essentially no green strength. With increasing alumina concentration from 5% to 20%, the measured green strength was satisfactory, and increased gradually from about 1.5 mPa to about 2.5 mPa.

It was found that with these alumina-bonded samples, bonding into a body occurred already at 600° C. in air for two hours, whereas for pure $TiB_2$ no sintering occurs even at 1200° C. (sintering requires temperatures above 2000° C. and the application of pressure). The colloidal alumina promotes the sintering of the titanium diboride and makes the titanium diboride a hard and wear resistant material. Good interparticle bonding between the titanium diboride particles is noted after sintering.

The electrical resistivity of the samples was also measured and was lowest for colloidal alumina contents in the range 7–15%. Below 5% alumina, the resistivity was very high, due to the fact that such low colloidal alumina content does not promote sintering. Increasing the colloidal alumina content increases the electrical resistivity by increasing the volume percentage of non-conducting material in the sample.

We claim:

1. A method of producing a self-sustaining body of refractory borides from the group consisting of the borides of titanium, chromium, vanadium, zirconium, hafnium, niobium, tantalum, molybdenum and cerium, in which the body includes a refractory boride and a colloid selected from the group consisting of colloidal alumina, silica, yttria, ceria, thoria, zirconia, magnesia, lithia, monoaluminium phosphate and cerium acetate, and is obtained from a slurry of particulate refractory boride in one or more of said colloids by forming and drying the slurry, by casting the slurry into a die or mold and draining the liquid or by the application of pressure to squeeze the liquid out.

2. The method of claim 1, wherein the slurry is cast into a die or mold on a porous layer and the cast slurry is allowed to dry by draining the liquid through the porous layer.

3. The method of claim 1, wherein the self-sustaining body is formed with the application of pressure.

4. The method of claim 1, wherein the dried body is subjected to heat treatment to bond the particulate refractory boride in the dried colloid.

5. The method of claim 1, wherein the colloid is derived from colloid precursors and reagents which are solutions of at least one salt such as chlorides, sulfates, nitrates, chlorates, perchlorates or metal organic compounds such as alkoxides, formates, acetates of aluminium, silicon, yttrium, cerium, thorium, zirconium, magnesium and lithium.

6. The method of claim 5, wherein the colloid precursor or colloid reagent contains a chelating agent such as acetyl acetone or ethylacetoacetate.

7. The method of claim 5, wherein the solutions of metal organic compounds, principally metal alkoxides, are of the general formula $M(OR)_z$ where M is a metal or complex cation, R is an alkyl chain and z is a number, preferably from 1 to 12.

8. The method of claim 1, wherein the particulate refractory boride is titanium diboride.

9. The method of claim 1, wherein the particulate refractory boride has a particle size below 100 micrometers.

10. The method of claim 9, wherein the particulate refractory boride comprises particles of different sizes to optimize packing of the particles, with a particle size ratio of at least 2:1.

11. The method of claim 10, wherein the particle size ratio of the particulate refractory boride is in the range 3:1 to 10:1.

12. The method of claim 10, wherein the particulate metal boride has particles with sizes in the range from about 3 micrometers to about 50 micrometers.

13. The method of claim 1, comprising 5–100 g of the particulate refractory boride per 10 ml of colloid.

14. The method of claim 1, wherein the colloid has a dry colloid content corresponding to up to 50 weight % of the colloid plus liquid carrier, preferably from 5 to 20 weight %.

15. The method of claim 1, wherein the dried slurry further comprises reinforcing fibers or a woven or reticulated reinforcing body.

* * * * *